United States Patent
Zhang et al.

(10) Patent No.: US 9,762,128 B2
(45) Date of Patent: Sep. 12, 2017

(54) CONTROL CIRCUIT OF ISOLATED CONVERTER AND SWITCHING POWER SUPPLY, AND CONTROL METHOD FOR THE SAME

(71) Applicant: Silergy Semiconductor Technology (Hangzhou) LTD, Hangzhou, ZheJiang Province (CN)

(72) Inventors: Shaobin Zhang, Hangzhou (CN); Yongjiang Bai, Hangzhou (CN); Zhiliang Hu, Hangzhou (CN); Le Li, Hangzhou (CN); Jinping Dong, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/130,740

(22) Filed: Apr. 15, 2016

(65) Prior Publication Data

US 2016/0329816 A1 Nov. 10, 2016

(30) Foreign Application Priority Data

May 8, 2015 (CN) .......................... 2015 1 0233160

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0032* (2013.01);
(Continued)

(58) Field of Classification Search
CPC ............... H02M 3/33507; H02M 1/08; H02M 2001/0048; H02M 2001/0032; Y02B 70/1491; Y02B 70/16
See application file for complete search history.

(56) References Cited

U.S. PATENT DOCUMENTS 8,767,415 B2   7/2014   Chen
9,054,592 B2   6/2015   Yao et al.
(Continued)

OTHER PUBLICATIONS

Received STIC search report from EIC 2800 searcher Benjamin Martin on Jan. 4, 2017.*

*Primary Examiner* — Jue Zhang
*Assistant Examiner* — Htet Z Kyaw
(74) *Attorney, Agent, or Firm* — Michael C. Stephens, Jr.

(57) ABSTRACT

Controlling an isolated converter can include: controlling a first voltage signal across the secondary winding according to a wake-up signal to reflect change of an output voltage of the isolated converter; obtaining a second voltage signal representing the first voltage signal at the primary side; controlling the main power switch according to a detection result of the second voltage signal; generating the wake-up signal according to the output voltage and a first threshold voltage when the isolated converter is in a dynamic loading state of a normal operating mode; generating the wake-up signal according to the output voltage and a second threshold voltage when the isolated converter is in a load steady state of a standby operating mode; and generating the wake-up signal according to the output voltage and a third threshold voltage when the isolated converter is in a dynamic loading state of the standby operating mode.

12 Claims, 5 Drawing Sheets

(52) U.S. Cl.
CPC .. *H02M 2001/0048* (2013.01); *Y02B 70/1491* (2013.01); *Y02B 70/16* (2013.01)

(56) References Cited

U.S. PATENT DOCUMENTS

| | | | |
|---|---|---|---|
| 9,287,796 B2* | 3/2016 | Liao | H02M 5/40 |
| 9,407,155 B2* | 8/2016 | Wang | H02M 3/33592 |
| 9,543,844 B2* | 1/2017 | Gong | H02M 3/33523 |
| 2006/0055433 A1* | 3/2006 | Yang | H02M 3/33507 327/10 |
| 2008/0157742 A1* | 7/2008 | Martin | H02M 3/1584 323/284 |
| 2009/0316441 A1* | 12/2009 | Hu | H02M 3/33592 363/21.06 |
| 2013/0235620 A1* | 9/2013 | Morris | H02M 3/335 363/21.12 |
| 2013/0250627 A1* | 9/2013 | Herfurth | H02M 3/33507 363/21.15 |
| 2013/0301309 A1 | 11/2013 | Chen | |
| 2013/0329463 A1 | 12/2013 | Chen | |
| 2014/0078789 A1* | 3/2014 | Li | H02M 3/33523 363/21.15 |
| 2014/0254215 A1* | 9/2014 | Brinlee | H02M 3/33507 363/21.15 |
| 2015/0280578 A1 | 10/2015 | Huang et al. | |
| 2016/0020700 A1* | 1/2016 | Zhang | H02M 3/33576 363/21.16 |
| 2016/0043647 A1* | 2/2016 | Rapisarda | H02M 3/33507 363/21.12 |
| 2016/0079875 A1* | 3/2016 | Lin | H02M 3/33592 363/21.14 |
| 2016/0190938 A1* | 6/2016 | Wang | H02M 3/33507 363/21.12 |

* cited by examiner

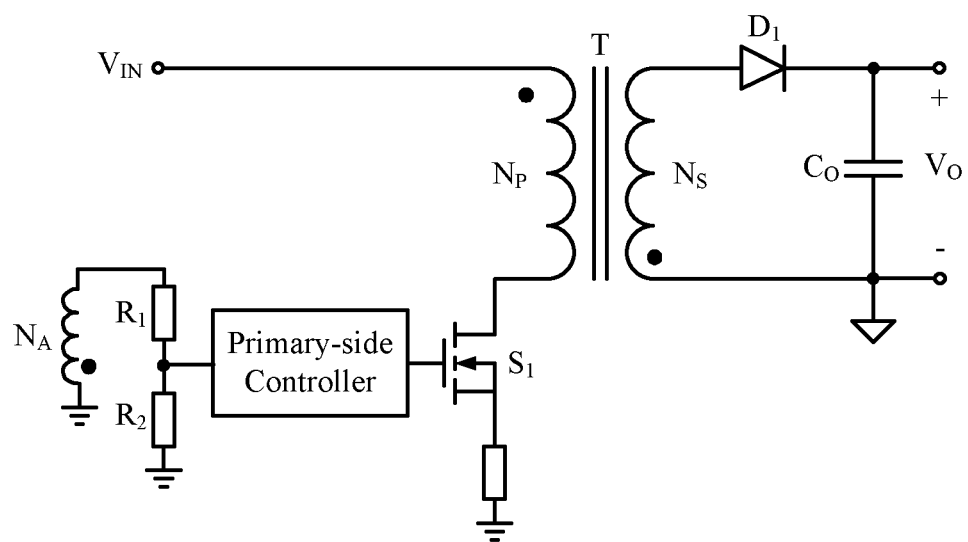
FIG. 1 (conventional)

US 9,762,128 B2

CONTROL CIRCUIT OF ISOLATED CONVERTER AND SWITCHING POWER SUPPLY, AND CONTROL METHOD FOR THE SAME

RELATED APPLICATIONS

This application claims the benefit of Chinese Patent Application No. 201510233160.5, filed on May 8, 2015, which is incorporated herein by reference in its entirety.

FIELD OF THE INVENTION

The present disclosure generally relates to the field of switching power supplies, and more particularly to control circuits and methods of operation of an isolated converter and a switching power supply.

BACKGROUND

Primary controlled switching power supplies are widely used in applications, such as LED drivers, chargers, adapters, and so on, due to fewer components, a simplified structure, and lower product costs. As shown in FIG. 1, an output voltage may be sampled by detecting a voltage across an auxiliary winding of a transformer. Such a primary controlled system may sample the output voltage by detecting a voltage across the auxiliary winding of the transformer in every switching cycle, instead of directly detecting the output voltage. Thus, drawbacks of this approach may be in failing to timely obtain the output voltage change information when an output load switches from a light-load or no-load state to a heavy-load or full-load state, resulting in relatively poor dynamic performance. Also, the system frequency may be unable to be further decreased due to dynamic response characteristics of the primary controlled system, which can limit the decrease of power losses.

BRIEF DESCRIPTION OF THE DRAWINGS

FIG. 1 is an example of a conventional primary-side control circuit.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a control circuit of an isolated converter comprising a transformer having a primary winding and a secondary winding, a main power switch coupled with the primary winding, and a freewheeling diode coupled with the secondary winding, can include: (i) a secondary-side controller configured to generate a wake-up signal according to an output voltage of the isolated converter to control a first voltage signal across the secondary winding to represent change of the output voltage of the isolated converter; (ii) the secondary-side controller being configured to generate the wake-up signal according to the output voltage and a first threshold voltage when the isolated converter is in a dynamic loading state of a normal operating mode; (iii) the secondary-side controller being configured to generate the wake-up signal according to the output voltage and a second threshold voltage when the isolated converter is in a load steady state of a standby operating mode; (iv) the secondary-side controller being configured to generate the wake-up signal according to the output voltage and a third threshold voltage when the isolated converter is in a dynamic loading state of the standby operating mode; (v) a primary-side feedback circuit configured to obtain a second voltage that represents the first voltage signal; and (vi) a primary-side controller configured to detect the second voltage signal and to control the main power switch according to a detection result in order to maintain the output voltage of the isolated converter at a predetermined value.

Figure 2:
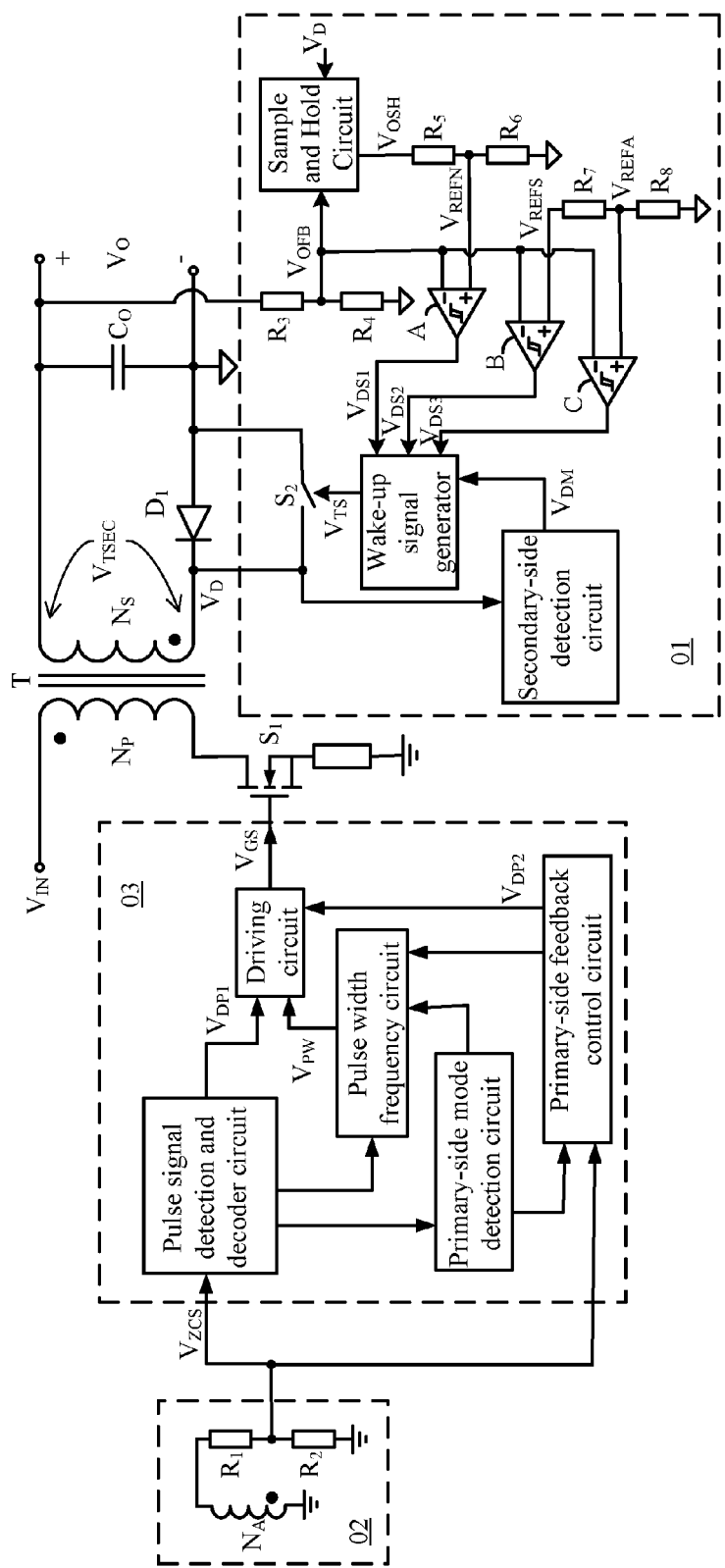
FIG. 2 is a schematic block diagram of an example control circuit of an isolated converter, in accordance with embodiments of the present invention.

Referring now to FIG. 2, shown is a schematic block diagram of an example control circuit of an isolated converter, in accordance with embodiments of the present invention. In this particular example, the isolated converter may be a flyback converter, but other topologies can also be supported in certain embodiments. Here, the isolated converter can receive input voltage signal $V_{IN}$, and may provide stable output voltage $V_O$ for a load (e.g., an LED). For example, the flyback converter can include a transformer having primary winding $N_p$ and secondary winding $N_s$, main switch $S_1$ coupled to primary winding $N_p$, and a freewheeling diode coupled to secondary winding $N_s$. In this example, the freewheeling diode may be diode $D_1$ having a cathode connected to the secondary winding, and an anode connected to a reference potential. One skilled in the art will recognize that the freewheeling diode with one terminal coupled to the secondary winding and the other terminal coupled to a positive pole of an output capacitor, while a negative pole can connect to ground, can also be supported in certain embodiments.

In this particular example, the control circuit of the isolated converter can include secondary-side controller 01, primary-side feedback circuit 02, and primary-side controller 03. Secondary-side controller 01 can generate wake-up signal $V_{TS}$ for controlling voltage signal $V_{TSEC}$ across the secondary winding to represent the change of the output voltage of the isolated converter. The process of generating wake-up signal $V_{TS}$ by secondary-side controller 01 can include generating wake-up signal $V_{TS}$ according to the relationship of the output voltage and a first threshold voltage by the secondary-side controller when the isolated converter is in a dynamic loading state of a normal operating mode. Wake-up signal $V_{TS}$ can be generated according to the relationship of the output voltage and a second threshold voltage by the secondary-side controller when the isolated converter is in a load steady state of a standby operating mode. Wake-up signal $V_{TS}$ can be generated according to the relationship of the output voltage and the third threshold voltage by the secondary-side controller when the isolated converter is in a dynamic loading state of a standby operating mode.

From the generation of the wake-up signal, it can be seen that the wake-up signal is a signal that represents the change of the output voltage according to the output voltage, such that voltage signal $V_{TSEC}$ is controlled to represent the change of the output voltage. In this particular example, secondary-side controller 01 can also include a switching circuit coupled in parallel with diode $D_1$ in parallel. Wake-up signal $V_{TS}$ can control voltage signal $V_{TSEC}$ to represent the change of the output voltage by controlling the conduction (on) and shutdown (off) states of the switching circuit. Principles of controlling voltage signal $V_{TSEC}$ to represent the output voltage by the wake-up signal will be described in more detail below in conjunction with example operating waveforms (see, e.g., FIGS. 3-5).

As shown in FIG. 2, secondary-side controller 01 can include a first secondary-side detection circuit, a second secondary-side detection circuit, a third secondary-side detection circuit, a secondary mode detection circuit, and a wake-up signal generator. The first secondary-side detection circuit can detect if output voltage $V_O$ is less than a first threshold voltage, and may generate secondary-side detection signal $V_{DS1}$. The first secondary-side detection circuit can include a second voltage bleeder, a sample and hold circuit, a third voltage bleeder, and a first comparison circuit. The second voltage bleeder can divide output voltage $V_O$, in order to obtain output voltage feedback signal $V_{OFB}$. The sample and hold circuit can receive output voltage feedback signal $V_{OFB}$, and may obtain sample and hold voltage $V_{OSH}$ by sampling the output voltage feedback signal at a fixed time in each switching cycle.

For example, the sample and hold circuit can receive voltage $V_D$ at a cathode of the freewheeling diode, and may generate a time point of sampling based on voltage $V_D$, in one example, when voltage $V_D$ indicates that freewheeling diode $D_1$ has stopped working, the sample and hold circuit may begin sampling output voltage feedback signal $V_{OFB}$ and generating sample and hold voltage $V_{OSH}$, so as to further obtain reference signal $V_{REFN}$ via the third voltage bleeder. The first comparison circuit can compare the output voltage feedback signal against the reference signal, and may generate secondary-side detection signal $V_{DS1}$. For example, the ratio between the reference signal and the first threshold voltage can be equal to the ratio between output voltage feedback signal $V_{OFB}$ and output voltage $V_O$. Thus, the first comparison circuit can compare the output voltage against the first threshold voltage by comparing the output voltage feedback signal $V_{OFB}$ and reference signal $V_{REFN}$.

In this particular example, the first threshold voltage may be represented by the reference signal which is determined by the sampling voltage of the output voltage at a fixed moment in a previous switching cycle. So, the first threshold voltage may actually change along with the output voltage, so as to control the decrease of the output voltage to be a relatively low value. For example, by setting the second voltage bleeder and the third voltage bleeder, reference signal $V_{REFN}$ can be, e.g., about 97% of the output voltage feedback signal. If the first threshold voltage is 97% of output voltage $V_O$, the decrease of output voltage $V_O$ can be at most about 3% when the isolated converter is in the dynamic loading state of the normal operating mode. In addition, wake-up signal $V_{TS}$ can be active, and thus the switching state of the main power switch at the primary-side may be fast controlled by indirectly sensing the decrease of the output voltage through detecting voltage signal $V_{ZCS}$ which is affected by the wake-up signal, such that output voltage $V_O$ may increase and be maintained at a predetermined value. In this way, the first threshold voltage can change along with the output voltage when the isolated converter is in the normal operating mode, so as to improve the dynamic response speed of the isolated converter.

In this particular example, the second voltage bleeder can include $R_3$ and $R_4$, and the third voltage bleeder can include $R_5$ and $R_6$. In other examples, the first secondary-side detection circuit may not include the second voltage bleeder and the third voltage bleeder, the sample and hold circuit may directly sample the output voltage to obtain the first threshold voltage, and the first comparison circuit may directly compare the output voltage against the first threshold voltage. The first comparison circuit can be implemented by comparator A with a non-inverting terminal that receives reference signal $V_{REFN}$, an inverting terminal that receives output voltage feedback signal $V_{OFB}$, and an output terminal that generates secondary-side detection signal $V_{DS1}$.

The second secondary-side detection circuit can detect if the output voltage is smaller or less than the second threshold voltage, and may generate secondary-side detection signal $V_{DS2}$. For example, the second secondary detection circuit can include comparator B with a non-inverting terminal that receives fixed reference voltage $V_{REFS}$, an inverting terminal that receives output voltage feedback signal $V_{OFB}$, and an output terminal that generates secondary-side detection signal $V_{DS2}$. For example, the ratio between reference voltage $V_{REFS}$ and threshold voltage may be equal to the ratio between the output voltage feedback signal and the output voltage.

The third secondary-side detection circuit can detect if the output voltage is smaller or less than the third threshold voltage, and may generate secondary-side detection signal $V_{DS3}$. For example, the third secondary-side detection circuit can include a fourth voltage bleeder and comparator C. The fourth voltage bleeder can divide reference voltage $V_{REFS}$ in order to obtain reference voltage $V_{REF4}$. Comparator C may have a non-inverting terminal that receives reference voltage $V_{REF4}$, an inverting terminal that receives output voltage feedback signal $V_{OFB}$, and an output terminal that generates secondary-side detection signal $V_{DS3}$. The ratio between reference voltage $V_{REF4}$ and the third threshold voltage may be equal to the ratio between the output voltage feedback signal and the output voltage. Thus, reference voltage $V_{REF4}$ can represent the third threshold voltage, which may be less or smaller than the second threshold voltage. The output voltage can be determined by reference voltage $V_{REFS}$ when the isolated converter is in the load steady state, and output voltage feedback signal $V_{OFB}$ can be maintained at reference voltage $V_{REFS}$, when the isolated converter is in the dynamic loading state of the standby operating mode. The decrease of output voltage feedback signal $V_{OFB}$ may be determined by reference voltage $V_{REF4}$.

Thus, reference voltage $V_{REF4}$ can equal to about 97% of reference voltage $V_{REFS}$ by setting the fourth voltage bleeder, so as control the decrease of output voltage $V_O$ to be about 3% when the isolated converter is in the dynamic loading state of the standby operating mode. Once output voltage feedback signal $V_{OFB}$ is decreased to be lower than reference voltage $V_{REF4}$ (e.g., output voltage feedback signal $V_{OFB}$ is about 97% of the predetermined output voltage when the isolated converter is in the load steady state of the standby operating mode), the secondary-side controller can activate wake-up signal $V_{TS}$, and the primary-side controller can control the operating state of the main power switch, so as to maintain the output voltage at a predetermined value, and to improve the dynamic response speed in the standby operating mode.

The secondary-side mode detection circuit can detect the present operating mode of the isolated converter, and may generate secondary-side mode detection signal $V_{DM}$. The secondary-side mode detection signal can be used to indicate if the isolated converter is in the normal operating mode or in the standby operating mode. For example, the secondary-side mode detection circuit can detect the operating mode of the isolated converter according to the voltage at the cathode of freewheeling diode $D_1$. When the secondary-side detection signal indicates the isolated converter is in the standby operating mode, secondary-side controller 01 may enter into a sleep mode to reduce the static operational current of the secondary-side controller. The secondary-side controller entering the sleep mode can mean that the unrelated circuits besides the second secondary-side detection circuit, the third secondary-side detection circuit, and the wake-up signal generator are disabled when the isolated converter is in the standby operating mode, while only the circuits relevant to the sleep mode can be enabled for operation.

The wake-up signal generator can receive secondary-side detection signal $V_{DS1}$, secondary-side detection signal $V_{DS2}$, secondary-side detection signal $V_{DS3}$, and secondary-side mode detection signal $V_{DM}$, and may generate wake-up signal $V_{TS}$. The wake-up signal generator can be controlled by the secondary-side mode detection signal, in order to generate the wake-up signal $V_{TS}$ according to secondary-side detection signal $V_{DS1}$, secondary-side detection signal $V_{DS2}$, and/or secondary-side detection signal $V_{DS3}$.

In this particular example, the freewheeling diode of the isolated converter can be diode $D_1$, and secondary-side controller 01 also can include a switching circuit coupled in parallel with the diode. Also, wake-up signal $V_{TS}$ can control voltage signal $V_{TSEC}$ by controlling the switching states of the switching circuit. For example, the switching circuit can include switch $S_2$ coupled between the anode and cathode of the diode $D_1$, and may be controlled by wake-up signal $V_{TS}$. For example, when wake-up signal $V_{TS}$ is high, switch $S_2$ can be turned on, and voltage signal $V_{TSEC}$ may go high to represent the change of the output voltage. Primary-side feedback circuit 02 can be set at the primary-side of the isolated converter to obtain voltage signal $V_{ZCS}$ at the primary-side, which represents voltage signal $V_{TSEC}$.

For example, primary-side feedback circuit 02 can include primary-side auxiliary winding NA coupled with the primary winding $N_P$ and secondary winding $N_S$ of transformer T, and a first voltage bleeder. Primary-side auxiliary winding NA can obtain a primary-side auxiliary voltage that is proportional to voltage signal $V_{TSEC}$, and the first voltage bleeder may obtain voltage signal $V_{ZCS}$ by dividing the primary-side auxiliary voltage. Also, the first voltage bleeder can include resistors $R_1$ and $R_2$, but the configuration can include forms in different cases. Voltage signal $V_{TSEC}$ may represent wake-up signal $V_{TS}$, and voltage signal $V_{ZCS}$ may represent voltage signal $V_{TSEC}$. Thus, wake-up signal $V_{TS}$ can be represented by voltage signal $V_{ZCS}$ at the primary side, after being transmitted to the primary-side of the isolated converter because of the coupling relationship of the secondary winding and the primary-side auxiliary winding. Because voltage signal $V_{TSEC}$ can represent the change of the output voltage, it may be able to reflect the change of the output voltage by detecting voltage signal $V_{ZCS}$ at the primary side, in order to control the isolated converter.

Primary side controller 03 at the primary side can detect voltage signal $V_{ZCS}$, and may control the switching state of the main power switch according to the detection result, in order to maintain the output voltage of the isolated converter be the predetermined value. In this example, primary side controller 03 can include a pulse signal detection and decoder circuit to detect voltage signal $V_{ZCS}$, and generate primary-side detection signal $V_{DP1}$ for controlling the switching state of the main power switch. The pulse signal detection and decoder circuit can receive voltage $V_{ZCS}$, and may obtain the change of the output voltage after decoding voltage signal $V_{ZCS}$. When the output voltage is lower than the predetermined voltage (e.g., wake-up signal $V_{TS}$ is active), primary-side detection signal $V_{DP1}$ can be activated to turn on main power switch $S_1$, such that more energy can be transmitted to the secondary side from the primary side, and the output voltage may be maintained at the predetermined voltage.

The primary-side controller can also include a primary-side feedback control circuit, a pulse width frequency circuit, and a driving circuit. The primary-side feedback control circuit can detect the primary-side feedback signal of the output voltage, and may generate primary-side detection signal $V_{DP2}$ for controlling the switching state of the main power switch. In this example, the primary-side feedback signal can be voltage signal $V_{ZCS}$, and the primary-side feedback control circuit can detect if the primary-side feedback signal is the predetermined value, such that the output voltage is maintained at the predetermined value when the isolated converter is in the load steady state of the normal operating mode.

The pulse width frequency circuit can generate pulse frequency control signal $V_{PW}$ according to primary-side detection signal $V_{DP1}$ and primary-side detection signal $V_{DP2}$, such that the pulse width and the frequency of the driving signal of the main power switch Are increased to further increase the response speed of the system in the dynamic loading state when the isolated converter is in the dynamic loading state of the normal operating mode or the standby operating mode. The driving circuit can receive primary-side detection signal $V_{DP1}$, primary-side detection signal $V_{DP2}$, and pulse width frequency signal $V_{PW}$, and may generate driving signal $V_{GS}$. Driving signal $V_{GS}$ can control the turn on/off of the main power switch. For example, driving signal $V_{GS}$ can be generated when the isolated converter is in the dynamic loading state of the normal operating mode (or the standby operating mode). Driving signal $V_{GS}$ may also have a higher frequency and a larger pulse width than when in the load steady state of the normal operating mode (or the standby operating mode), and when the frequency is very low and pulse width is very small in the load steady state of the standby operating mode.

Primary-side controller 03 also can include a primary-side detection circuit to detect the present operating mode of the isolated converter, and the primary-side controller can the sleep mode when the isolated converter is in the standby operating mode. The primary-side controller entering the sleep mode may mean that remaining signals besides the signal for generating primary-side detection signal $V_{DP1}$ in the primary-side controller are inactive when the isolated converter is in the standby operating mode, so as to decrease the standby loss of the isolated converter. In this case, the load steady state can refer to that in which the load of the isolated converter is essentially in a stable state, and the dynamic loading state can refer to that in which the load fast switches to heavy-load or full-load from no-load or light-load.

In this way, the control circuit of the isolated converter in certain embodiments can generate different wake-up signals by setting different threshold values when the isolated converter operates in different modes. Thus, the decrease of the output voltage can be relatively small when the isolated converter is in the dynamic loading state. Also, the dynamic response speed of the system can be improved, and the operating frequency may be relatively low when the isolated converter is in the load steady state of the standby operating mode, in order to effectively reduce standby losses.

Figure 3:
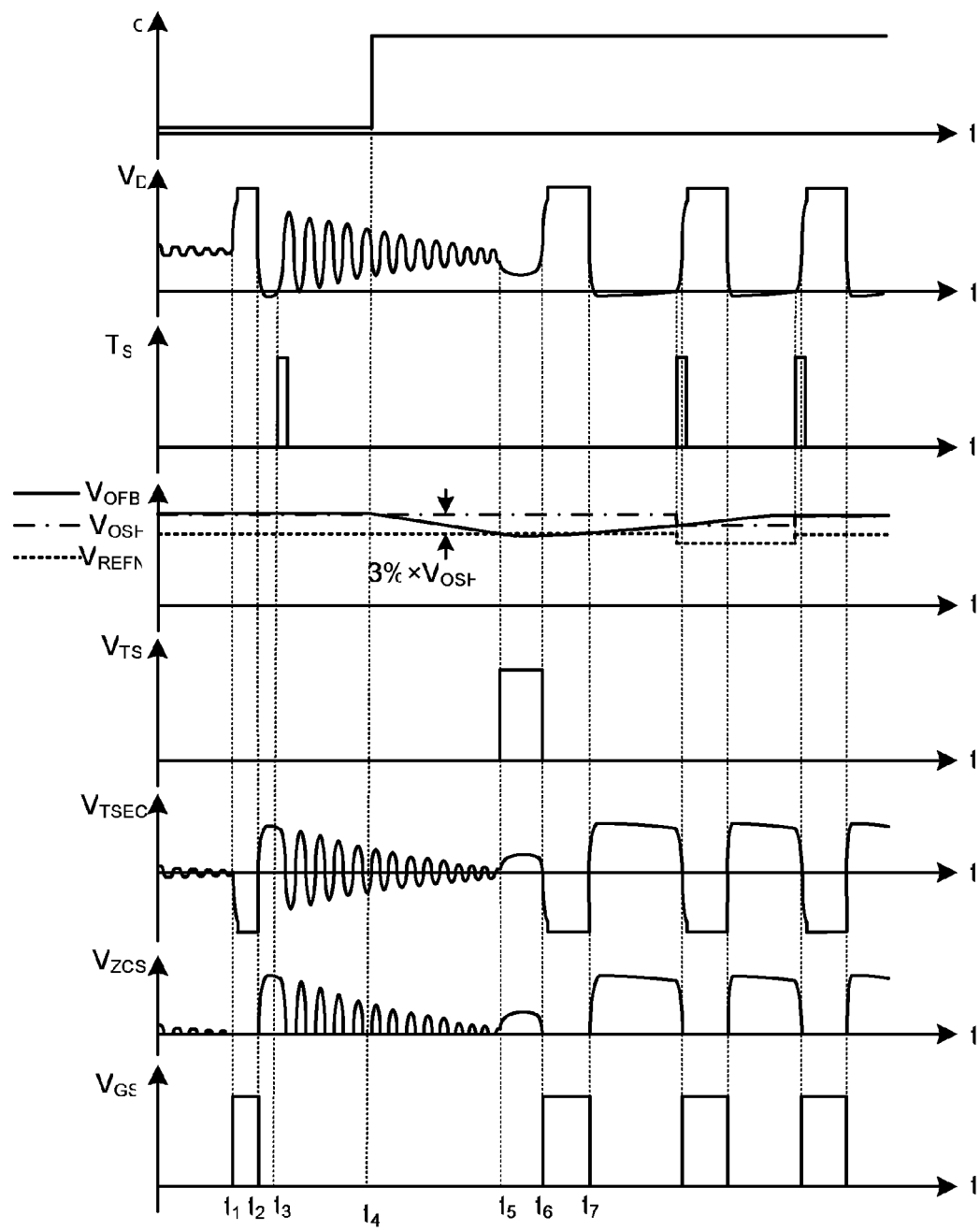
FIG. 3 is a waveform diagram of example operation of the control circuit of FIG. 2 when the isolated converter is in a dynamic loading state of a normal operating mode, in accordance with embodiments of the present invention.

Referring now to FIG. 3, shown is a waveform diagram of example operation of the control circuit of FIG. 2 when the isolated converter is in a dynamic loading state of a normal operating mode, in accordance with embodiments of the present invention. In FIG. 3, Io is an output current of the isolated converter, $V_D$ is a voltage at the cathode of freewheeling diode $D_1$, $T_S$ is a sense signal obtained by sampling the voltage $V_D$ through the sample and hold circuit (e.g., the output voltage is sampled when sense signal Ts is high). During the time interval $t_1 \sim t_4$, switching control signal $V_{GS}$ can be controlled by detection signal $V_{DP2}$. At time $t_2$, main power switch $S_1$ may be off, freewheeling diode $D_1$ can be turned off, and the freewheeling operation can end. The sample and hold circuit can activate sense signal Ts based on voltage $V_D$ at time $t_3$ (e.g., the sampling operation can begin when the freewheeling diode is turned on). Here, the sample and hold circuit can obtain sample and hold voltage $V_{OSH}$ by sampling and holding output voltage feedback signal $V_{OFB}$. Also, the third voltage bleeder can make reference voltage $V_{REFN}$ to be about 97% of sample and hold voltage $V_{OSH}$, and comparator A can compare output voltage feedback signal $V_{OFB}$ against reference voltage $V_{REFN}$.

At time $t_4$, the isolated converter may enter a dynamic loading state, and the output current may rapidly rise and the output voltage can begin to decrease. At time $t_5$, output voltage feedback signal $V_{OFB}$ can be reduced to reference voltage $V_{REFN}$; that is, output voltage $V_O$ can be about 3% smaller/less than at time $t_3$. Then, comparator A can activate secondary-side detection signal $V_{DS1}$ to control the wake-up signal generator to generate wake-up signal $V_{TS}$ with a certain pulse width (e.g., the width lasts from $t_5$ to $t_6$). Wake-up signal $V_{TS}$ can control voltage signal $V_{TSEC}$ of the secondary winding to be high and voltage signal $V_{ZCS}$ to be high, when the pulse signal detection and decoder circuit detects that voltage signal $V_{ZCS}$ is larger than a predetermined value, and the pulse width of voltage signal $V_{ZCS}$ is larger than a predetermined value. Detection signal $V_{DP1}$ can be generated at time $t_6$ for controlling the pulse width frequency circuit to generate pulse width frequency signal $V_{PW}$, such that the driving circuit can generate a group of driving signals with relatively larger pulse widths and higher frequencies, to control the output voltage. In this way, the system dynamic response can be improved.

Figure 4:
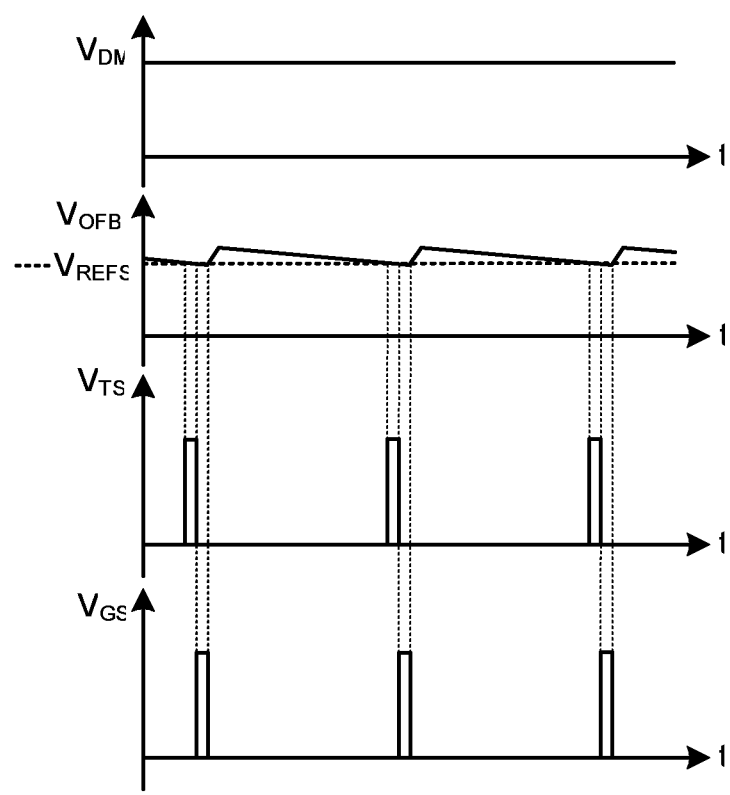
FIG. 4 is a waveform diagram of example operation of the control circuit of FIG. 2 when the isolated converter is in a load steady state of a standby operating mode, in accordance with embodiments of the present invention.

Referring now to FIG. 4, shown is a waveform diagram of example operation of the control circuit of FIG. 2 when the isolated converter is in a load steady state of a standby operating mode, in accordance with embodiments of the present invention. For example, as the isolated converter remains in the sleep mode during standby operating period, mode detection signal $V_{DM}$ generated at the secondary side may indicate if the isolated converter is in the standby operating mode (e.g., sleep mode). When mode detection signal $V_{DM}$ indicates the isolated converter is in the sleep mode (e.g., $V_{DM}$ is high level), output voltage feedback signal $V_{OFB}$ may take reference voltage $V_{REFS}$ as a reference, and when output voltage feedback signal $V_{OFB}$ is decreased to reference voltage $V_{REFS}$, wake-up signal $V_{TS}$ can be activated so as to accordingly generate switching control signal $V_{GS}$. That is, switching control signal $V_{GS}$ can be generated according to the relationship of output voltage feedback signal $V_{OFB}$ and reference voltage $V_{REFS}$ in the sleep mode, such that the output voltage is maintained at the second threshold voltage. It can be seen from the example of FIG. 4 that switching control signal $V_{GS}$ may have a relatively smaller pulse width and lower frequency in the sleep mode, so as to reduce standby losses.

Figure 5:
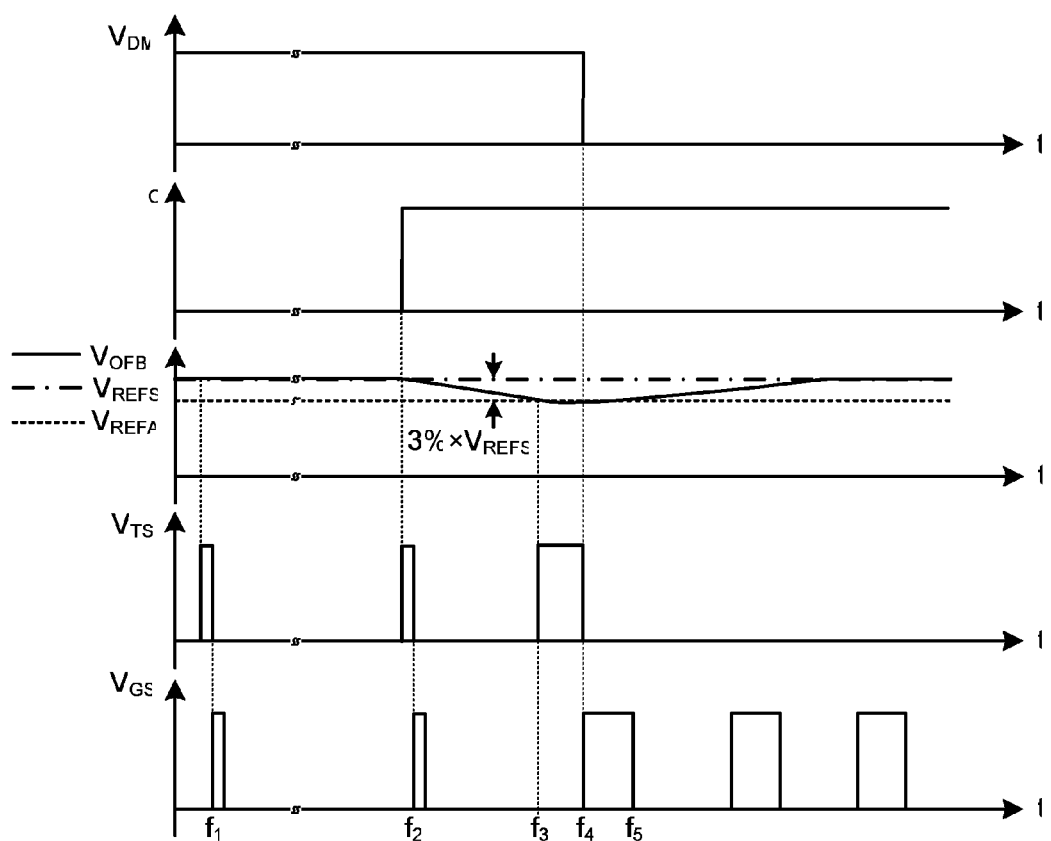
FIG. 5 is a waveform diagram of example operation of the control circuit of FIG. 2 when the isolated converter is in a dynamic loading state of a standby operating mode, in accordance with embodiments of the present invention.

Referring now to FIG. 5, shown is a waveform diagram of example operation of the control circuit of FIG. 2 when the isolated converter is in a dynamic loading state of a standby operating mode, in accordance with embodiments of the present invention. During the time interval $f_1$-$f_4$, mode detection signal $V_{DM}$ can be active to indicate that the isolated converter is in the sleep mode. Thus, main power switch $S_1$ can be controlled according to the operation shown in FIG. 4, such that the output voltage feedback voltage can be maintained at reference voltage $V_{REFS}$. In the sleep mode, at time $t_2$, the load of the isolated converter can begin increasing, the output current may rapidly rise, and the output voltage can decrease. Thus, the isolated converter can be in the dynamic loading state of the sleep mode after time $f_2$. At time $f_3$, output voltage feedback signal $V_{OFB}$ may be decreased to reference voltage $V_{REF4}$, which can be about 97% of reference voltage $V_{REFS}$ (e.g., the output voltage can be about 3% smaller/less than in the load steady state of the standby operating mode).

In such case, one or more wake-up signals $V_{TS}$ having pulse widths larger than in the load steady state of the standby operating mode can be generated at the secondary side, in order to reflect the change of the output voltage. Then, wake-up signals $V_{TS}$ can be transmitted to the primary side, such that that switching control signal $V_{GS}$ with relatively larger pulse widths and high frequencies can be generated at the primary side for controlling the output voltage to be rapidly increased to the predetermined voltage. This can improve system dynamic response characteristics.

Therefore, the control circuit of the isolated converter in certain embodiments can generate different wake-up signals by setting different threshold values when the isolated converter operates in different modes. Thus, the decrease of the output voltage can be relatively small when the isolated converter is in the dynamic loading state. This can improve the dynamic response speed of the system, and the operating frequency can be relatively lower when the isolated converter is in the load steady state of the standby operating mode, in order to effectively reduce the standby loss.

In one embodiment, a method of controlling an isolated converter with a transformer having a primary winding and a secondary winding, a main power switch coupled with the primary winding, and a freewheeling diode coupled with the secondary winding, can include: (i) controlling a first voltage signal across the secondary winding according to a wake-up signal to reflect change of an output voltage of the isolated converter; (ii) obtaining a second voltage signal that represents the first voltage signal at the primary side of the isolated converter; (iii) detecting the second voltage signal and controlling the main power switch according to a detection result in order to maintain the output voltage at a predetermined value; (iv) generating the wake-up signal according to the output voltage and a first threshold voltage when the isolated converter is in a dynamic loading state of a normal operating mode; (v) generating the wake-up signal according to the output voltage and a second threshold voltage when the isolated converter is in a load steady state of a standby operating mode; and (vi) generating the wake-up signal according to the output voltage and a third threshold voltage when the isolated converter is in a dynamic loading state of the standby operating mode.

Particular embodiments also include a control method for an isolated converter (e.g., a flyback converter). The flyback converter can include a transformer having a primary winding and a secondary winding, a main power switch coupled with the primary winding, and a freewheeling diode coupled with the secondary winding. The control method can include controlling a first voltage signal across the secondary winding according to a wake-up signal generated at the secondary side of the isolated converter to reflect the change of an output voltage of the isolated converter. The control method can also include obtaining a second voltage signal which represents the first voltage signal at the primary side of the isolated converter.

The control method can also include detecting voltage signal $V_{ZCS}$, and controlling the main power switch according to the detection result, in order to maintain the output voltage at a predetermined value. When the isolated converter is in a dynamic loading state of a normal operating mode, the wake-up signal can be generated at the secondary side according to the relationship of the output voltage and the first threshold voltage. When the isolated converter is in a load steady state of the standby operating mode, the wake-up signal can be generated at the secondary side according to the relationship of the output voltage and the second threshold voltage. Also, when the isolated converter is in a dynamic loading state of the standby operating mode, the wake-up signal is generated at the secondary side according to the relationship of the output voltage and the third threshold voltage.

The control method can also include detecting a primary-side feedback signal of the output voltage at the primary side to control the switching state of the main power switch. The control method can also include the primary-side controller and/or the secondary-side controller entering the sleep mode when the isolated converter is in the standby operating mode. Also, the pulse width and frequency of the driving signal of the main power switch can be increased when the isolated converter is in the dynamic loading state.

Particular embodiments can also include a switching power supply that includes a transformer having a primary winding and a secondary winding, a power switch being coupled with the primary winding, and a freewheeling diode being coupled with the secondary winding, where the switching power supply also includes a control circuit of an isolated converter, as described above. The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling an isolated converter comprising a transformer having a primary winding and a secondary winding, a main power switch coupled with said primary winding, and a freewheeling diode coupled with said secondary winding, the method comprising:

a) controlling a first voltage signal across said secondary winding according to a wake-up signal to reflect change of an output voltage of said isolated converter;

b) obtaining a second voltage signal that represents said first voltage signal at said primary side of said isolated converter;

c) detecting said second voltage signal and controlling said main power switch according to a detection result in order to maintain said output voltage at a predetermined value;

d) generating said wake-up signal according to said output voltage and a first threshold voltage when said isolated converter is in a dynamic loading state of a normal operating mode;

e) generating said wake-up signal according to said output voltage and a second threshold voltage when said isolated converter is in a load steady state of a standby operating mode; and f) generating said wake-up signal according to said output voltage and a third threshold voltage when said isolated converter is in a dynamic loading state of said standby operating mode.

2. The method of claim 1, further comprising detecting a primary-side feedback signal of said output voltage at said primary side for controlling said main power switch.

3. The method of claim 2, wherein at least one of a primary-side controller and a secondary-side controller enter a sleep mode when said isolated converter is in said standby operating mode.

4. The method of claim 2, wherein a pulse width and frequency of said driving signal of said main power switch are increased when said isolated converter is in said dynamic loading state.

5. A control circuit of an isolated converter comprising a transformer having a primary winding and a secondary winding, a main power switch coupled with said primary winding, and a freewheeling diode coupled with said secondary winding, the control circuit comprising:

a) a secondary-side controller configured to generate a wake-up signal according to an output voltage of said isolated converter to control a first voltage signal across said secondary winding to represent change of said output voltage of said isolated converter;

b) said secondary-side controller being configured to generate said wake-up signal according to said output voltage and a first threshold voltage when said isolated converter is in a dynamic loading state of a normal operating mode;

c) said secondary-side controller being configured to generate said wake-up signal according to said output voltage and a second threshold voltage when said isolated converter is in a load steady state of a standby operating mode;

d) said secondary-side controller being configured to generate said wake-up signal according to said output voltage and a third threshold voltage when said isolated converter is in a dynamic loading state of said standby operating mode;

e) a primary-side feedback circuit configured to obtain a second voltage that represents said first voltage signal; and f) a primary-side controller configured to detect said second voltage signal and to control said main power switch according to a detection result in order to maintain said output voltage of said isolated converter at a predetermined value.

6. The control circuit of claim 5, wherein said secondary-side controller comprises:
   a) a first secondary-side detection circuit configured to detect if said output voltage is smaller than a first threshold voltage, and to generate a first secondary-side detection signal;
   b) a second secondary-side detection circuit configured to detect if said output voltage is smaller than a second threshold voltage, and to generate a second secondary-side detection signal;
   c) a third secondary-side detection circuit configured to detect if said output voltage is smaller than a third threshold voltage, and to generate said third secondary-side detection signal;
   d) a secondary-side mode detection circuit configured to detect a present operating mode of said isolated converter, and to generate a secondary-side mode detection signal; and
   e) a wake-up signal generator configured to receive said first secondary-side detection signal, said second secondary-side detection signal, said third secondary-side detection signal, and said secondary-side mode detection signal, and to generate said wake-up signal.

7. The control circuit of claim 6, wherein said secondary-side controller further comprises a switching circuit coupled with said diode in parallel, and said wake-up signal is configured to control said first voltage signal by controlling the switching state of said switching circuit.

8. The control circuit of claim 6, wherein said secondary-side mode detection circuit is configured to control said secondary-side controller to enter a sleep mode when said isolated converter is in said standby operating mode.

9. The control circuit of claim 5, wherein said primary-side controller comprises a pulse signal detection and decoder circuit configured to detect said second voltage signal, and to generate a first primary-side detection signal to control said main power switch.

10. The control circuit of claim 9, wherein said primary-side controller comprises:
   a) a primary-side feedback control circuit configured to detect a primary-side feedback signal of said output voltage, and to generate a second primary-side detection signal to control said main power switch;
   b) a pulse width frequency circuit configured to generate a pulse width frequency control signal according to said first primary-side detection signal and said second primary-side detection signal, in order to increase a pulse width and frequency of said driving signal of said main power switch when said isolated converter is in said dynamic loading state; and
   c) a driving circuit configured to receive said first primary-side detection signal, said second primary-side detection signal, and said pulse width frequency signal, and to generate said driving signal.

11. The control circuit of claim 10, wherein said primary-side controller further comprises a primary-side detection circuit configured to detect a present operating mode of said isolated converter, wherein said primary-side controller is configured to enter said sleep mode when said isolated converter is in said standby operating mode.

12. A switching power supply, comprising said transformer and said control circuit of claim 5.

* * * * *